US007623254B2

(12) United States Patent
Eklund et al.

(10) Patent No.: US 7,623,254 B2
(45) Date of Patent: Nov. 24, 2009

(54) SYSTEMS AND METHODS FOR DETECTING INKJET DEFECTS

(75) Inventors: Elliott A. Eklund, Penfield, NY (US); Jeffrey J. Folkins, Rochester, NY (US); David L. Knierim, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 701 days.

(21) Appl. No.: 10/974,768

(22) Filed: Oct. 28, 2004

(65) Prior Publication Data

US 2006/0098251 A1 May 11, 2006

(51) Int. Cl.
*G06K 15/00* (2006.01)
*B41J 29/393* (2006.01)

(52) U.S. Cl. ........................ 358/1.14; 358/1.1; 358/1.5; 358/1.9; 358/1.12; 358/1.16; 358/1.18; 358/504; 347/9; 347/12; 347/13; 347/19; 347/47; 356/319; 356/402; 356/419; 399/301; 707/202; 714/1; 714/2

(58) Field of Classification Search .................. 347/19, 347/116, 9, 12, 13, 20, 47; 356/319, 402, 356/419; 358/1.9, 1.14, 3.26, 504, 518, 1.4, 358/1.8; 399/301; 707/202; 714/1, 2
See application file for complete search history.

(56) References Cited

U.S. PATENT DOCUMENTS

| | | | | |
|---|---|---|---|---|
| 4,255,754 | A | 3/1981 | Crean et al. | |
| 4,977,459 | A * | 12/1990 | Ebinuma et al. | 358/296 |
| 5,160,938 | A | 11/1992 | Fargo et al. | |
| 5,367,326 | A | 11/1994 | Pond et al. | |
| 5,389,958 | A | 2/1995 | Bui et al. | |
| 5,450,111 | A | 9/1995 | Mutoh | |
| 5,550,956 | A * | 8/1996 | Tadokoro | 358/1.14 |
| 5,600,352 | A | 2/1997 | Knierim et al. | |
| 5,627,571 | A * | 5/1997 | Anderson et al. | 347/19 |
| 5,721,620 | A | 2/1998 | Arai et al. | |
| 5,798,773 | A * | 8/1998 | Hiramatsu et al. | 347/19 |
| 5,815,175 | A | 9/1998 | Seikel | |
| 5,889,534 | A | 3/1999 | Johnson et al. | |
| 5,937,145 | A | 8/1999 | Garboden et al. | |
| 6,045,206 | A * | 4/2000 | Igval | 347/2 |
| 6,045,210 | A | 4/2000 | Suzuki et al. | |
| 6,106,088 | A * | 8/2000 | Wafler | 347/7 |
| 6,130,682 | A * | 10/2000 | Kohno et al. | 347/19 |
| 6,145,981 | A * | 11/2000 | Akahira et al. | 347/107 |
| 6,238,112 | B1 * | 5/2001 | Girones et al. | 400/74 |
| 6,273,542 | B1 | 8/2001 | Couwenhoven et al. | |
| 6,278,469 | B1 * | 8/2001 | Bland et al. | 347/19 |

(Continued)

OTHER PUBLICATIONS

U.S. Appl. No. 10/913,527, filed Sep. 30, 2004, Folkins et al.

*Primary Examiner*—King Y Poon
*Assistant Examiner*—Richard Z Zhu
(74) *Attorney, Agent, or Firm*—Oliff & Berridge, PLC

(57) ABSTRACT

A method for testing inkjets for defects in an inkjet device includes determining, based on the likelihood that one or more inkjets are defective, whether to perform an inkjet defect test, The method may also include, identifying, if it is determined to perform an inkjet defect test, which inkjets to test based on properties of the inkjets, the number of identified inkjets being less than a total number of inkjets in the inkjet device; and testing the identified inkjets for defects using an image sensor.

10 Claims, 9 Drawing Sheets

U.S. PATENT DOCUMENTS 6,371,590 B1 * 4/2002 Hah ............................ 347/19
6,447,091 B1 * 9/2002 Calvo et al. .................. 347/19
6,460,963 B1 * 10/2002 Endo ........................... 347/19
6,481,824 B1 * 11/2002 Hayakawa et al. ............ 347/24
6,511,150 B1 1/2003 Yoda et al.
6,533,384 B1 3/2003 Vega et al.
6,547,365 B1 * 4/2003 Alberto et al. ................ 347/19
6,582,051 B2 * 6/2003 Bruch et al. .................. 347/19
6,604,807 B1 8/2003 Murcia et al.
6,637,853 B1 * 10/2003 Ahne et al. ................... 347/19
6,644,772 B2 * 11/2003 Choi ........................... 347/19
6,814,422 B2 * 11/2004 Bruch et al. .................. 347/23
6,834,927 B2 * 12/2004 Yashima et al. ............... 347/15
6,893,106 B2 * 5/2005 Kuriyama et al. ............. 347/19
7,243,270 B2 * 7/2007 Taniguchi et al. ............. 714/44
7,490,918 B2 * 2/2009 Nagashima .................. 347/19
2001/0011260 A1 * 8/2001 Skaanning et al. ............ 706/46
2002/0141769 A1 * 10/2002 Phillips ....................... 399/38

* cited by examiner

SYSTEMS AND METHODS FOR DETECTING INKJET DEFECTS

BACKGROUND OF THE INVENTION

1. Field of Invention

This invention relates to systems and methods for inkjet defect detection.

2. Description of Related Art

There exists printers wherein and inkjet print head moves relative to and ejects marking material toward an intermediate substrate in order to form an image on the intermediate substrate. The inkjet print head includes a number of individual inkjets that each ejects an amount of marking material. Subsequently, the image is transferred from the intermediate substrate onto a sheet of media. The quality of the image formed on the sheet of media is influenced by, among other things, the ability of the individual inkjets to consistently eject ink.

Solid inkjet print heads are prone to develop defects such as clogged inkjets. For example, inkjets within the print head can become clogged such that ink is not consistently ejected. Once an inkjet becomes defective, it will remain defective until the defects are corrected. In other words, the defect that exists in the inkjet is semi-stable because it will not self correct over time. Typically, some maintenance is required in order to correct the inkjet defects. The defect will thus remain with the inkjet until some maintenance is performed. The maintenance may include a purging operation that purges material or air that is clogging the defective inkjet.

Conventionally, in order to determine whether one or more inkjets is defective, an image is printed on a sheet of media utilizing every inkjet of an inkjet print head and the image is visually inspected in order to detect any defects in the inkjets. If the image contains defects, a user can then initiate print head maintenance. However, printing a separate test image and manually initiating maintenance is both system resource (e.g., media, ink, and time that might otherwise be used for productive output) and user resource (e.g., time required to initiate test image, review test image, and initiate maintenance) intensive.

Xerographic devices have addressed the problem of wasted system and user resources by printing test images onto an intermediate substrate within inter-document zones. When images are laid down on the intermediate substrate in xerographic devices, based on the typical system architecture, there is sufficient space between those images on the intermediate substrate to print a test image between the images to be printed. By using an internal image sensor, the xerographic device can evaluate the test image for defects and then perform maintenance on the print head if it is determined to be defective.

SUMMARY OF THE INVENTION

As discussed above, inkjets within an inkjet image reproduction device may become defective as the marking intensity attributes (e.g. drop mass, drop velocity, directionality, etc.) drift with time. Inkjet defects are typically caused by an amount of marking material clogging or partially clogging the defective inkjet. For example, a clogged or partially clogged jet can change the drop mass, the drop velocity, and/or the direction in which the drop is ejected from a nozzle of the inkjet.

In an attempt to detect defective inkjets, the general concept of an Image on Drum (IOD) sensor has been proposed to allow a machine to measure inkjet defects (e.g., clogged inkjets) and self-compensate. An IOD sensor is a sensor configured to monitor, for example, the presence, intensity, and/or location of marking material jetted on the intermediate substrate by the inkjets of a print head. An IOD sensor could generally include, for example, a light source and one or more optical detectors situated to detect marking material on the intermediate substrate.

As a result, a user would not have to manually evaluate a test image and manually initiate print head maintenance procedures. However, simply providing basic inkjet defect detection with an IOD as a standalone procedure does not provide the most efficient systems solution since the inkjet defect detection procedure takes time, consumes ink, and utilizes other precious systems resources if invoked too often.

Basic inkjet defect detection with an IOD as a standalone procedure does not provide the most efficient systems solution because the timing and drum size in a multi-pass inkjet device are generally configured so that all regions in an inter-document zone on an intermediate substrate come into contact with the transfer roller. A transfer roller applies pressure to the back of a sheet of media as the sheet of media is transported between the intermediate substrate and the transfer roller. Inter-document areas are areas on the intermediate substrate between the areas on which images to be transferred to media are marked. Any test images marked onto the intermediate substrate in an inter-document zone would be subsequently transferred to the transfer roller, since no sheet of media comes into contact with the intermediate substrate in an inter-document zone. Because the image is transferred to the transfer roller, when the next sheet of media is transported between the intermediate substrate and the transfer roller, the image on the transfer roller would be transferred onto the backside of the sheet of media. Accordingly, test images must be marked on the intermediate substrate during a test cycle independent of a print job. As a result, system resources that are dedicated to the independent test cycle are wasted (i.e., cannot be utilized for print cycles).

Thus, in order to further conserve time, ink, and other precious system resources, U.S. patent application Ser. No. 10/953,527 proposes systems and methods that incorporate the marking of test images onto blank portions of the intermediate substrate, other than the inter-document zones within a standard print cycle, thereby reducing wasted system resources. U.S. patent application Ser. No. 10/953,527 is incorporated herein by reference in its entirety.

However, it has also been discovered that an inkjet's failure rate (.i.e., the rate at which it becomes defective) is related to the frequency with which the inkjet is used. Conventionally, inkjet defect testing is performed at intervals that do not consider an inkjet's failure rate. Thus, if all of the inkjets of a print head are tested at a frequent enough interval to maintain the inkjets with the highest failure rate, the resulting frequent testing of the inkjets that have a lower failure rate results in wasted system resources.

It has further been discovered that certain inkjets within an inkjet head are more prone to become defective, for example due to clogging, when compared with other inkjets in the same print head. Conventionally, all of the inkjets of a print head are tested for defects at the same time. If all of the inkjets of a print head are tested at a frequent enough interval to maintain the inkjets most prone to defects, the resulting frequent testing of the inkjets that are less likely to fail results in wasted system resources.

Accordingly, various exemplary embodiments of this invention provide a method for testing inkjets for defects in an inkjet device including determining, based on the likelihood that one or more inkjets are defective, whether to perform an inkjet defect test; and performing, if it is determined to perform an inkjet defect test, an inkjet defect test using an image sensor.

Various exemplary embodiments of this invention provide a method for testing inkjets for defects in an inkjet device including identifying which inkjets to test based on properties of the inkjets, the number of the identified inkjets being less than a total number of the inkjets in the inkjet device; and testing the identified inkjets for defects using an image sensor.

Various exemplary embodiments of this invention provide a system for testing inkjets for defects in an inkjet device including an image sensor that is configured to detect at least one of the presence, intensity, and location of marking material jetted on an intermediate substrate by the inkjets of the inkjet device. The system also includes a controller that determines, based on the likelihood that one or more inkjets are defective, whether to perform an inkjet defect test; and performs, if it is determined to perform an inkjet defect test, an inkjet defect test using the image sensor.

Various exemplary embodiments of this invention provide a system for testing inkjets for defects in an inkjet device including an image sensor that is configured to detect at least one of the presence, intensity, and location of marking material jetted on an intermediate substrate by the inkjets of the inkjet device. The system also includes a controller that identifies which inkjets to test based on properties of the inkjets, the number of identified inkjets being less than a total number of inkjets in the inkjet device; and tests the identified inkjets for defects using the image sensor.

BRIEF DESCRIPTION OF THE DRAWINGS

Exemplary embodiments of the invention will now be described with reference to the accompanying drawings, wherein.

DETAILED DESCRIPTION OF PREFERRED EMBODIMENTS

Figure 1:
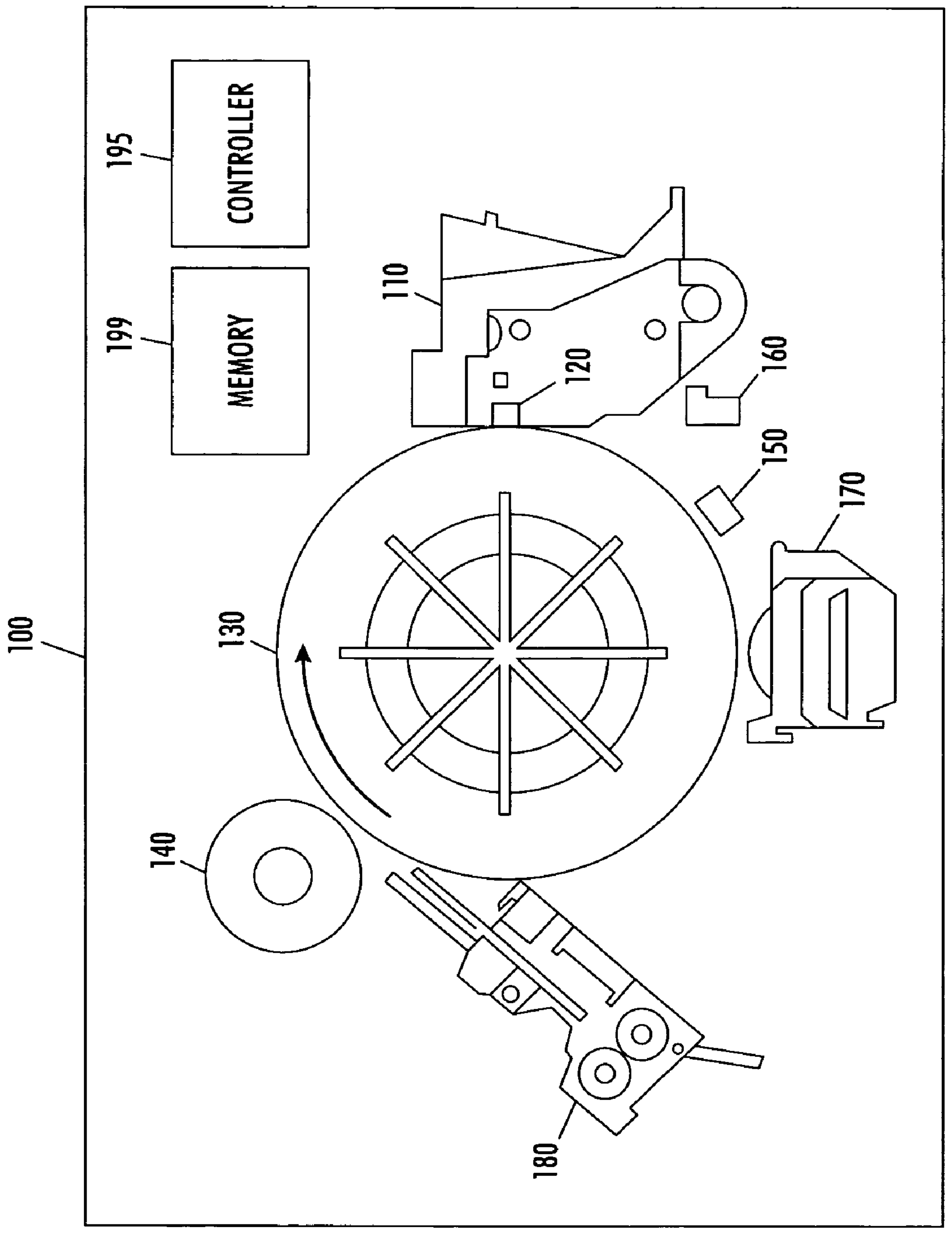
FIG. 1 shows an exemplary embodiment of an inkjet device configured for marking images on the image drum.
Figure 2:
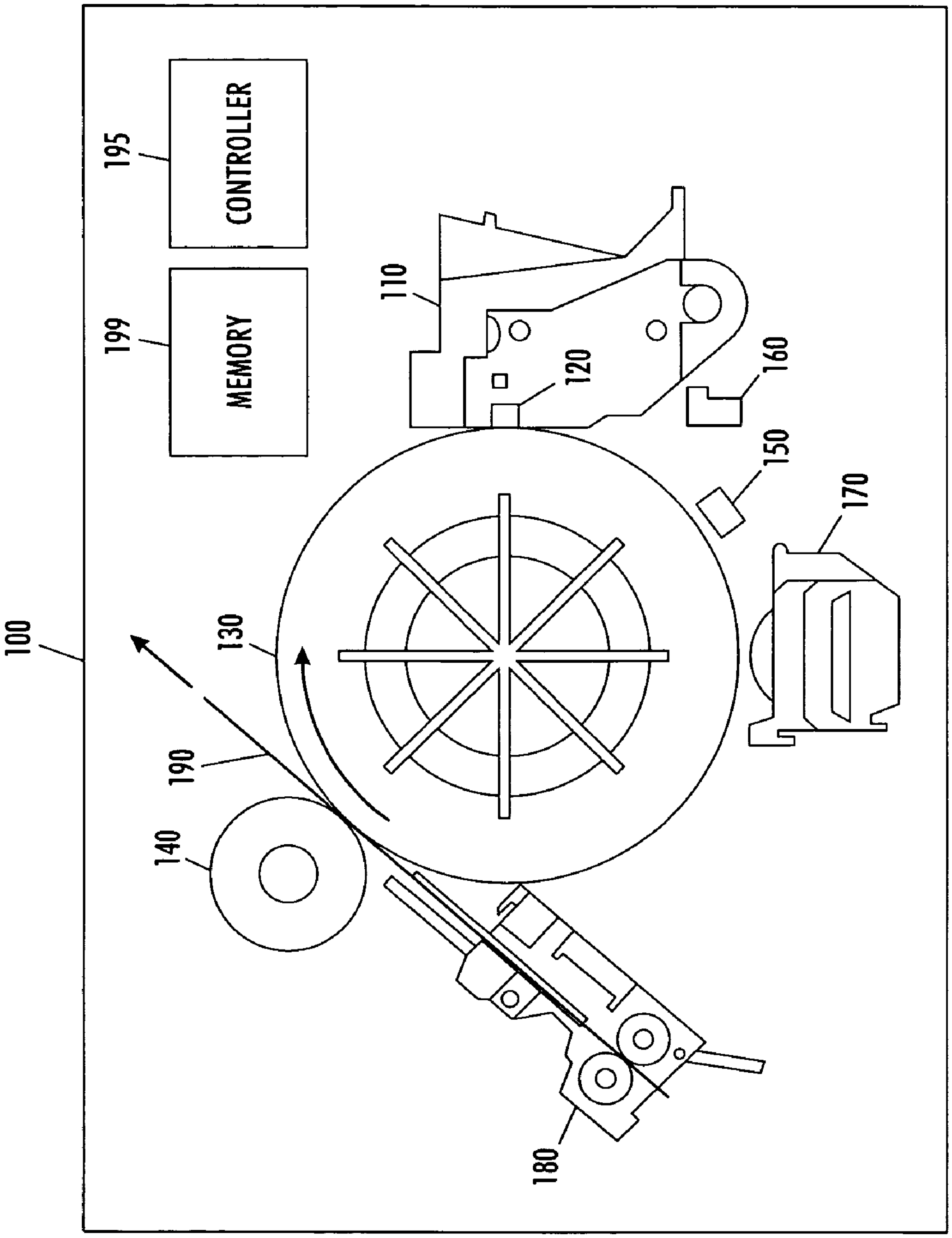
FIG. 2 shows the exemplary inkjet device of FIG. 1 configured to transfer images marked on the drum to sheets of media.
Figure 3:
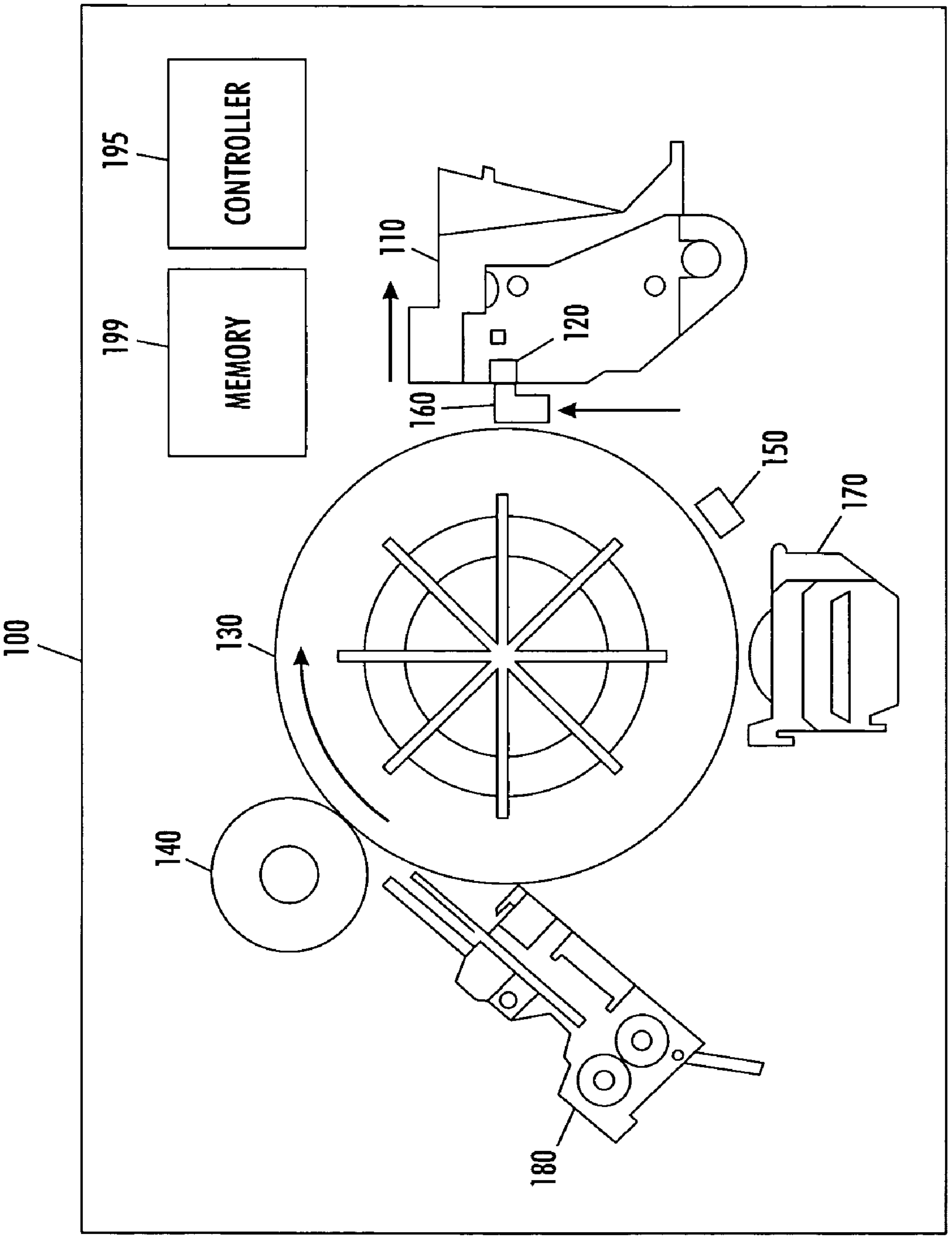
FIG. 3 shows the exemplary inkjet device of FIGS. 1 and 2 configured to perform maintenance on the print head.

For a general understanding of an inkjet device, such as, for example, a solid inkjet printer, an ink-jet printer, or an inkjet facsimile machine, in which the features of this invention may be incorporated, reference is made to FIGS. 1-3. Although the various exemplary embodiments of this invention for detecting inkjet defects are particularly well adapted for use in such a machine, it should be appreciated that the following exemplary embodiments are merely illustrative. Rather, aspects of various exemplary embodiments of this invention may be achieved in any media feed mechanism and/or image reproduction device containing at least one print head with inkjets intended to transfer an image onto an intermediate image substrate.

As shown in FIG. 1, the exemplary inkjet device 100 includes, in part, a print head 110, one or more inkjets 120, an intermediate transfer substrate (intermediate transfer drum 130), a transfer roller 140, an image sensor 150, a print head maintenance unit 160, a drum maintenance unit 170, a media pre-heater 180 that constitutes a portion of the media feed path, a controller 195, and a memory 199. The memory may include for example, any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like. It should be appreciated that the controller 195 and/or memory 199 may be a combination of a number of component controllers or memories all or part of which may be located outside the inkjet device 100.

When configured to mark an image on the intermediate transfer drum 130, as shown in FIG. 1, the print head 110, under the control of the controller 195, is positioned in close proximity to the intermediate transfer drum 130. As a result, under the control of the controller 195, the inkjets 120 deposit marking material on the intermediate transfer drum 130 to form an image. Marking material is deposited on the intermediate transfer drum 130 in portions. For each portion, one or more inkjets 120 receive an ink ejection signal from the controller 195, and as a result, substantially simultaneously eject marking material on the intermediate transfer drum 130. Marking material is thus ejected portion by portion until the whole image is formed on the intermediate transfer drum 130. While the marking material is being deposited on the intermediate transfer drum 130, the transfer roller 140 is not in contact with the intermediate transfer drum 130.

According to various exemplary embodiments of the invention, a single image may cover the entire intermediate transfer drum 130 (single-pitch). According to various other exemplary embodiments, a plurality of images may be marked on the intermediate transfer drum 130 (multi-pitch). Furthermore, the images may be marked in a single pass (single pass method), or the images may be marked in a plurality of passes (multi-pass method).

When images are marked on the intermediate transfer drum 130 according to the multi-pass method, under the control of the controller 195, a small amount of marking material (marked portion-by-portion as discussed above) representing the image is marked by the inkjets 120 during a first rotation of the intermediate transfer drum 130. Then during one or more subsequent rotations of the intermediate transfer drum 130, under the control of the controller 195, marking material representing the same image is laid on top of the original image thereby increasing the total amount of marking material representing the image on the intermediate transfer drum 130.

For example, one type of a multi-pass marking architecture is used to accumulate images from multiple color separations. On each rotation of the intermediate substrate (intermediate transfer drum 130), marking material for one of the color separations (component image) is deposited on the surface of the intermediate transfer drum 130 until the last color separation is deposited to complete the image. Another type of multi-pass marking architecture is used to accumulate images from multiple swaths of the print head 120. On each rotation of the intermediate transfer drum 130, marking material for one of the swaths (component image) is applied to the surface of the intermediate transfer drum 130 until the last swath is applied to complete the image. Both of these examples of multi-pass marking architectures perform what is commonly known as "page printing." Each image comprised of the various component images represents a full sheet of media 190 worth of marking material which, as described below, is then transferred from the intermediate transfer drum 130 to the sheet of media 190.

In a multi-pitch marking architecture, the surface of the intermediate substrate (e.g., intermediate transfer drum 130) is partitioned into multiple segments, each segment including a full-page image (i.e., a single pitch) and an inter-document zone. For example, a two-pitch intermediate transfer drum 130 is capable of marking two images, each corresponding to a single sheet of media 190, during a revolution of the intermediate transfer drum 130. Likewise, for example, a three-pitch intermediate transfer drum 130 is capable of marking three images, each corresponding to a single sheet of media 190, during a pass or revolution of the belt.

Once an image or images have been marked on the intermediate transfer drum 130 according to either of the single-pass method or multi-pass method, under the control of the controller 195, the exemplary inkjet device 100 converts to a configuration for transferring the image or images from the intermediate transfer drum 130 onto a sheet of media 190. According to this configuration, shown in FIG. 2, a sheet of media 190 is transported through the media pre-heater 180, under the control of the controller 195, to a position adjacent to and in contact with the intermediate transfer drum 130. When the sheet of media 190 contacts the intermediate transfer drum 130, the transfer roller 140 is re-positioned, under the control of the controller 195, to apply pressure on the back side of the sheet of media 190 in order to press the sheet of media 190 against the intermediate transfer drum 130 (FIG. 2). The pressure created by the transfer roller 140 on the back side of the sheet of media 190 facilitates the transfer of the marked image from the intermediate transfer drum 130 on to the sheet of media 190.

Due to the rolling of the intermediate transfer drum 130 and the transfer roller 140 (shown by arrows in FIG. 2), the image or images on the intermediate transfer drum 130 is/are transferred onto the sheet of media 190, or sheets of media 190, while the sheet of media 190, or sheets of media 190 are transported through the exemplary inkjet device 100 (in a direction shown by an arrow in FIG. 2).

Once an image is transferred from the intermediate transfer drum 130 onto a sheet of media 190, as discussed above, the intermediate transfer drum 130 continues to rotate and, under the control of the controller 195, any residual marking material left on the intermediate transfer drum 130 is removed by the drum maintenance unit 170.

According to this exemplary embodiment, test images may be marked on blank portions of the intermediate transfer drum 130, according to, for example, the methods described in U.S. patent application Ser. No. 10/953,527. Only those inkjets 120 which are likely to be defective are utilized to mark the test image(s). Thus, the time and ink required to mark the test image(s) with the inkjets 120 unlikely to be defective is not wasted. The test image(s) can then be evaluated by the image sensor 150 to measure any defects of the tested inkjets 120. Based on the measurements, the controller 195 can initiate a print head maintenance cycle (see FIG. 3).

When it is determined that print head maintenance is required (i.e., a defect was recognized in an inkjet 120 or print head 110 during a test sequence), the exemplary inkjet device 100, under the control of the controller 195, enters, for example, a print head maintenance mode, shown in FIG. 3. During print head maintenance, under the control of the controller 195, the print head is retracted from the intermediate transfer drum 130 (as shown by an arrow in FIG. 3) and, under the control of the controller 195, a print head maintenance unit 160 is positioned adjacent the inkjets 120. The print head maintenance unit 160, under the control of the controller 195, purges the inkjets 120 to correct any clogged or partially clogged inkjets.

An exemplary embodiment of a method for detecting defective inkjet print heads and inkjets according to the invention will be described with reference to FIGS. 4-6, 9, and 10. According to the exemplary embodiment shown in FIGS. 4-6, 9, and 10, rather than testing all inkjets 120 in a print head 110 at a regular interval, statistical data is used to adjust the test interval. Furthermore, once an inkjet test is to be performed, each individual inkjet 120 is evaluated to determine whether that inkjet 120 should be included in the test. By reducing the testing frequency and number of inkjets tested, less system resources are dedicated to testing the inkjets.

Figure 4:
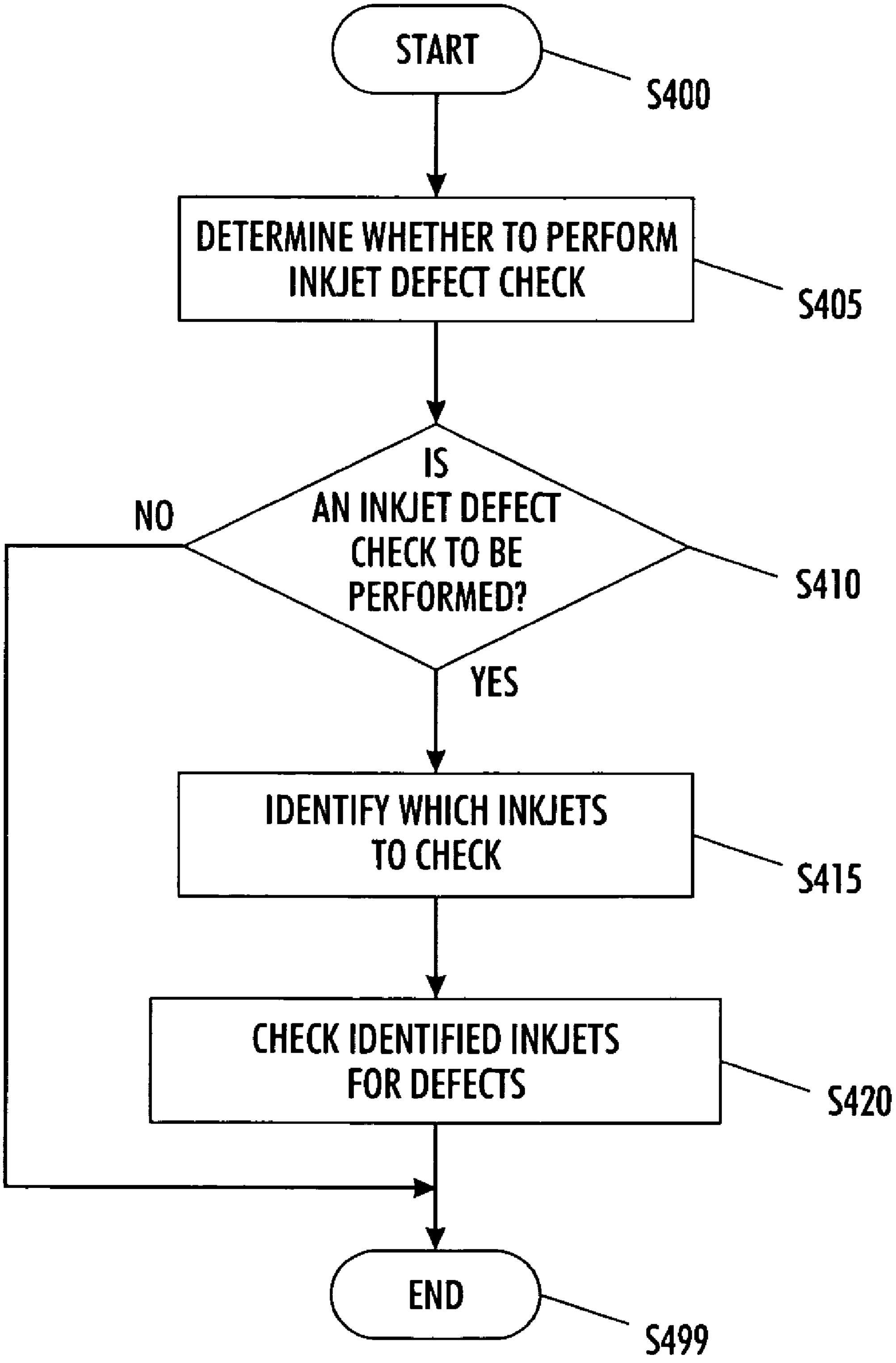
FIG. 4 shows an exemplary method for detecting defective inkjets.

As shown in FIG. 4, operation of the method begins in step S400. Next, in step S405 it is determined whether an inkjet defect test should be performed. This may be determined, for example, by the exemplary method for determining whether to perform an inkjet defect test shown in FIG. 5.

Figure 5:
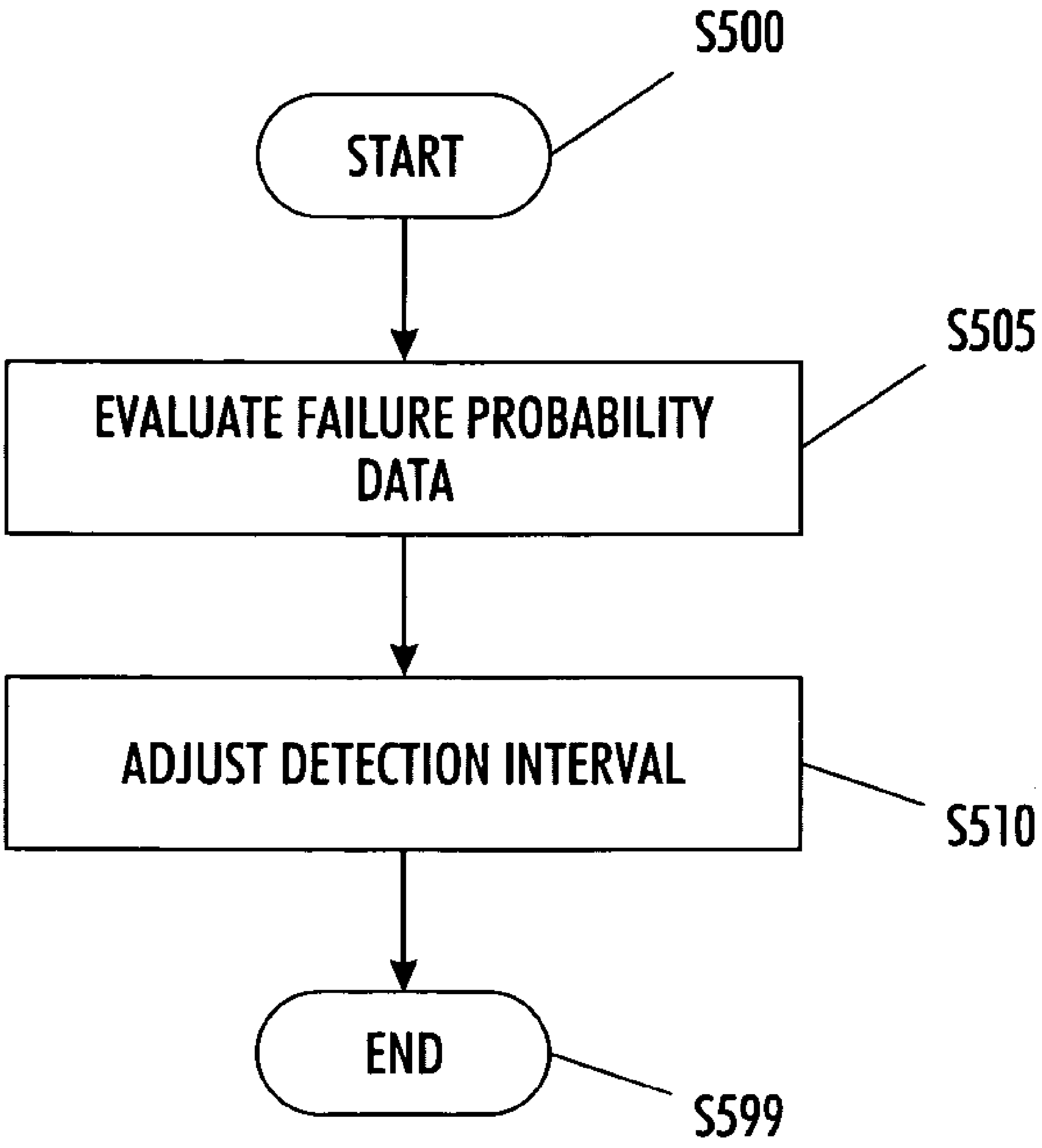
FIG. 5 shows an exemplary method for determining whether to perform an inkjet 120 defect test.

As shown in FIG. 5, operation of the method begins in step S500. Then, in step S505 failure probability data is evaluated. The failure probability data is data collected, which may or may not be statistically adjusted or analyzed, which indicates the failure pattern for the inkjet device 100. The failure probability data may be stored, for example, in memory 199. For example, failure probability data for an inkjet device can be found by fitting observed failure data to a parameterized failure distribution, such as for example, the Weibull or log-normal distributions, or can be estimated directly from the failure data using, for example, Kaplan-Meier estimation. This type of failure probability data is usable to predict the probability that a recoverable failure will occur, as a function of the number of prints since the last failure. A "failure" is when one or more inkjets become defective by, for example, clogging. A failure is "recoverable" when the one or more defective inkjets can be repaired by, for example print head maintenance.

Figure 9:
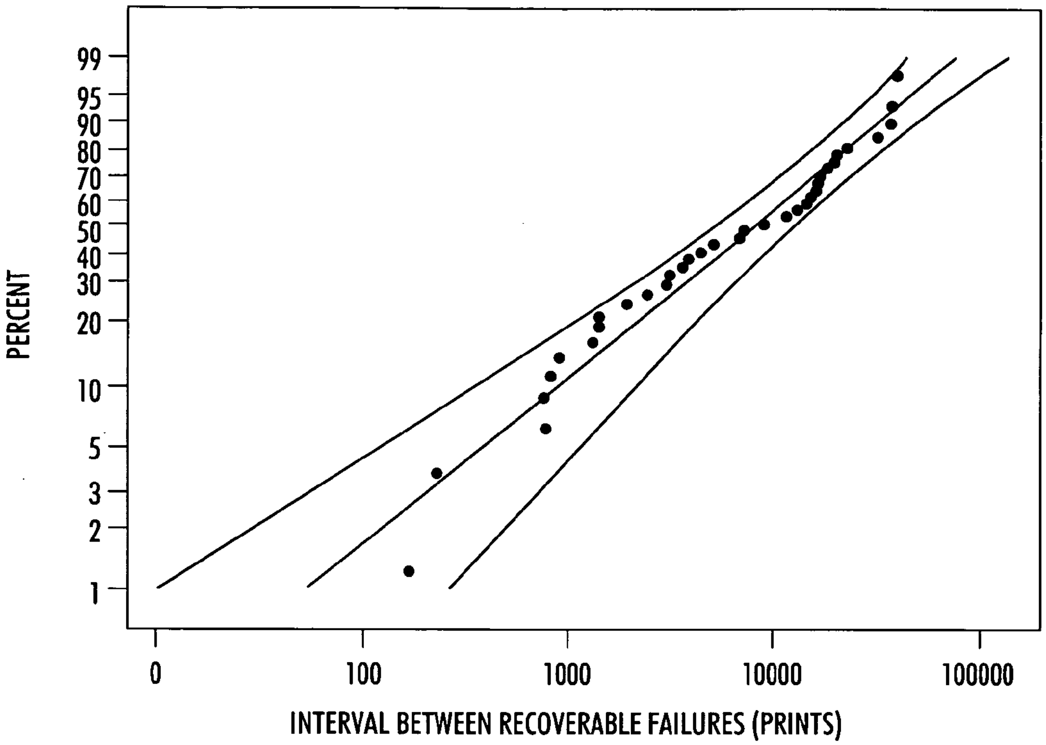
FIG. 9 shows an exemplary plot of typical failure data.

FIG. 9 shows an example of typical failure data for an inkjet device 100 obtained by testing conventional solid ink-jet print heads. This probability plot, which shows the percent chance that one or more inkjets will be defective (fail) plotted against the number of prints since a previous failure, is the means for fitting the experimental failure data to a failure distribution, in this case the Weibull distribution. This fit allows the extraction of the two parameters (shape and scale), which according to a Weibull distribution, characterize the failure interval distribution, and can be used to plot the failure probability data, shown in FIG. 10.

Figure 10:
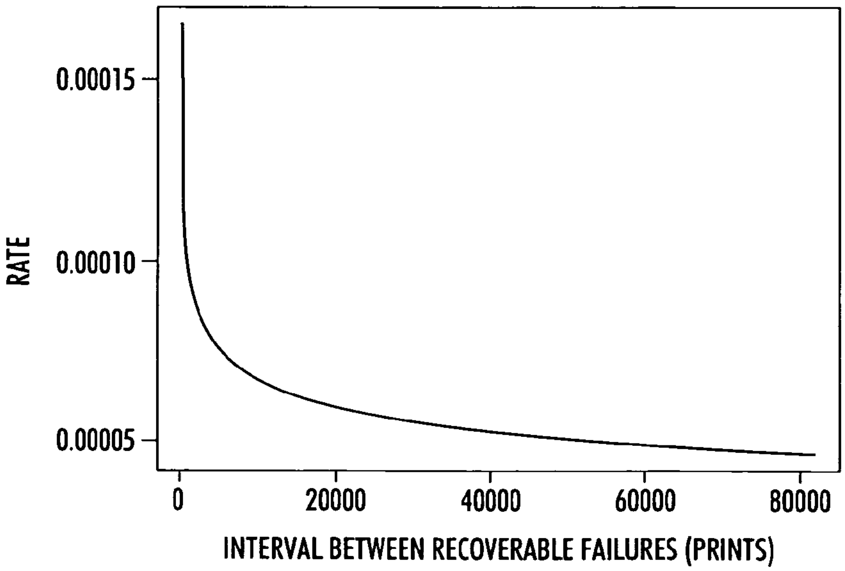
FIG. 10 shows an exemplary plot of failure probability data.

The failure probability data, shown in FIG. 10, is interpreted as giving the failure probability rate (increase in failure probability per print) as a function of print interval between failures. For example, as shown in FIG. 10, after 60000 prints since the most recent failure, the chance of a failure occurring is 0.00005 (i.e., 0.005%) per print. According to the example of FIG. 10, it can be seen that at small print intervals, the probability of another failure is at a relatively high rate. However, if the print head does not experience a failure after a certain interval length, the failure probability rapidly decreases. In other words, the rate at which the inkjet device becomes prone to failures is decreasing with an increasing print count. Although, the rate at which the failure probability is increasing is decreasing as print count increases, it should be appreciated that the overall probability of failure is increasing. Thus, when compared to a current print interval since a failure occurred and corresponding probability that a failure will occur, it will take a substantially longer print interval to, for example, double that probability that a failure will occur.

Suppose, for instance, that the inkjet device 100 was initially set to test for inkjet defects after every 1000 pages printed. Then, according to this exemplary embodiment, if after a first test of the inkjets 120, no defects were found, the detection interval may be adjusted to perform the next test after 1500 pages are printed. This is because the failure data in FIG. 10 indicates that the rate at which the probability of a failure is increasing is decreasing as the print interval between failures increases. However, if after the first test of the inkjets, defects are found, the detection interval may be adjusted to perform the next test after 500 pages are printed. If after the next test of the inkjets 120, no defects are found, the detection interval may be increased to perform the inkjet test after 750 pages are printed. This is because the failure data in FIG. 10 indicates that the rate at which the probability of a failure is increasing is larger at 500 pages compared to the original interval of 1000 pages. It should be appreciated that in other various exemplary embodiments the detection interval may be adjusted differently, depending on the failure data as long as the rate is lengthened, where applicable, to prevent an inkjet defect test that would have occurred based on a standard interval, but is unlikely to detect inkjet defects based on the failure data.

Operation continues to step S510 where the detection interval is adjusted based on the failure probability data. Then, operation continues to step S599, where operation of the method ends.

It should be appreciated that the detection interval may be set based on a number of factors including, for example, the time resources that are expected to be wasted should a failure occur, the time and resources that are expected to be wasted by testing for inkjet defects, and/or the failure probability data. Furthermore, it should be appreciated that the detection interval may be adjusted depending on the expected settings of the inkjet device 100. For example, if the inkjet device 100 is expected to output a very large job, the acceptable failure rate may be decreased since if a defect occurs a large amount of time and resources will be wasted. Similarly, if the inkjet device is expected to output a small job, the acceptable failure rate may be increased since, if a defect occurs, a small amount of time and resources will be wasted.

Returning to FIG. 4, in step S410, it is determined whether to perform an inkjet defect test based on, for example, whether the detection interval adjusted according to the exemplary method of FIG. 5 has been reached. If an inkjet defect test is to be performed, then operation continues to step S415. If the inkjet defect test is not to be performed, then operation jumps to step S499. In step S415, the inkjets to be tested are identified. The inkjets to be tested may be identified, for example, by the exemplary method for identifying which inkjets to test shown in FIG. 6. For ease of explanation, the method shown in FIG. 6 assumes that the inkjet device 100 has one print head 110 with a plurality of inkjets 120. However, the method may be repeated as necessary for an inkjet device 100 with a plurality of print heads 110.

Figure 6:
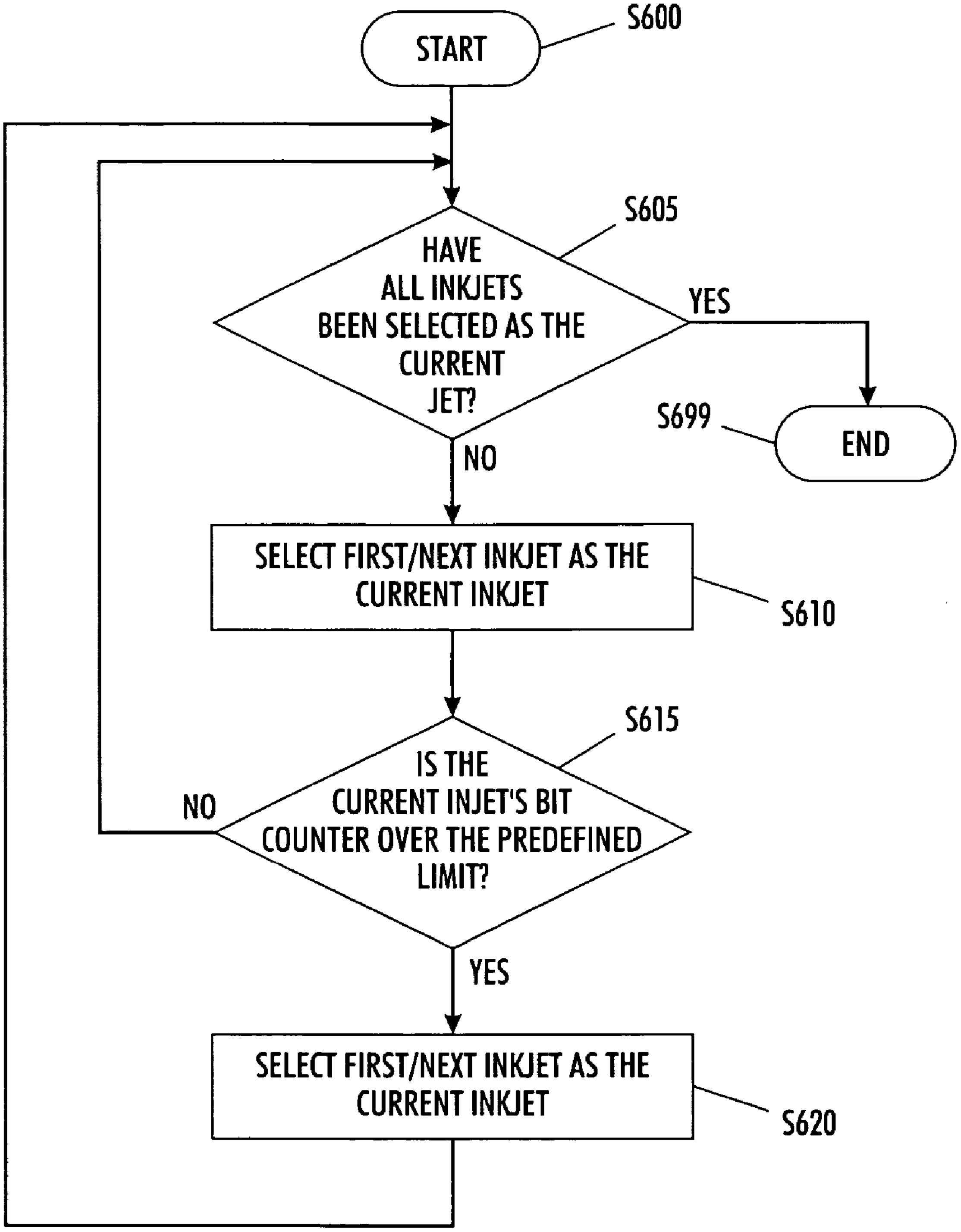
FIG. 6 shows an exemplary method for identifying which inkjets in a print head should be tested.

As shown in FIG. 6, operation of the method begins in step S600. Then, operation continues to step S605 where it is determined whether all of the inkjets 120 have been selected as the current inkjet. If all of the inkjets 120 have been selected as the current inkjet, all of the inkjets have been considered and operation jumps to step S699. However, if all of the inkjets 120 have not been selected as the current inkjet, operation continues to step S610. In step S610, the first/next inkjet 120 is selected as the current inkjet. Operation continues to step S615.

In step S615, it is determined whether the current inkjet should be tested for defects, for example, by determining whether a bit counter assigned to that inkjet is over a predefined limit. An exemplary method for monitoring the properties of inkjets using a bit counter is discussed below with reference to FIGS. 7 and 8. If the current inkjet's bit counter is not over the predefined limit, operation returns to step S605. If the current inkjet's bit counter is over the predefined limit, operation continues to step S620. In step S620, the inkjet counter is marked for an inkjet defect test. Then, operation returns to step S605.

It should be appreciated that the method shown in FIG. 6 will repeat until, in step S605, it is determined that all of the inkjets 120 in the print head 110 have been selected as the current inkjet. Then, operation jumps to step S699, where the method ends. As mentioned above, if the inkjet device 100 has a plurality of print heads, the method of FIG. 6 could be repeated for each print head until all inkjets 120 within all print heads 110 have been selected as the current inkjet.

Returning to FIG. 4, once inkjets have been identified to be tested (i.e., marked in step S620 based on the value of their respective bit counters), operation continues to step S420 where the identified inkjets 120 are tested for defects. Thus, instead of marking a test image on the intermediate transfer drum 130 using every inkjet 120 in each print head 110, a test image will be marked on the intermediate transfer drum 130, using only those inkjets identified as likely to have failed. Therefore, the ink and time that would be required to include the remaining inkjets 120 that are determined unlikely to have failed, will be saved. If the test indicates that one or more inkjets 120 are defective, then each print head 110 containing defective jets is purged to remove the clog(s). According to this exemplary embodiment, one an inkjet is purged that inkjets bit counter is reset. However, in other exemplary embodiments the bit counter may not be reset, but adjusted to a value indicating that the jet has recently been purged because in some inkjet devices 100, purging an unclogged inkjet 120 may in some situations actually increase that jets likelihood of becoming clogged.

Figure 7:
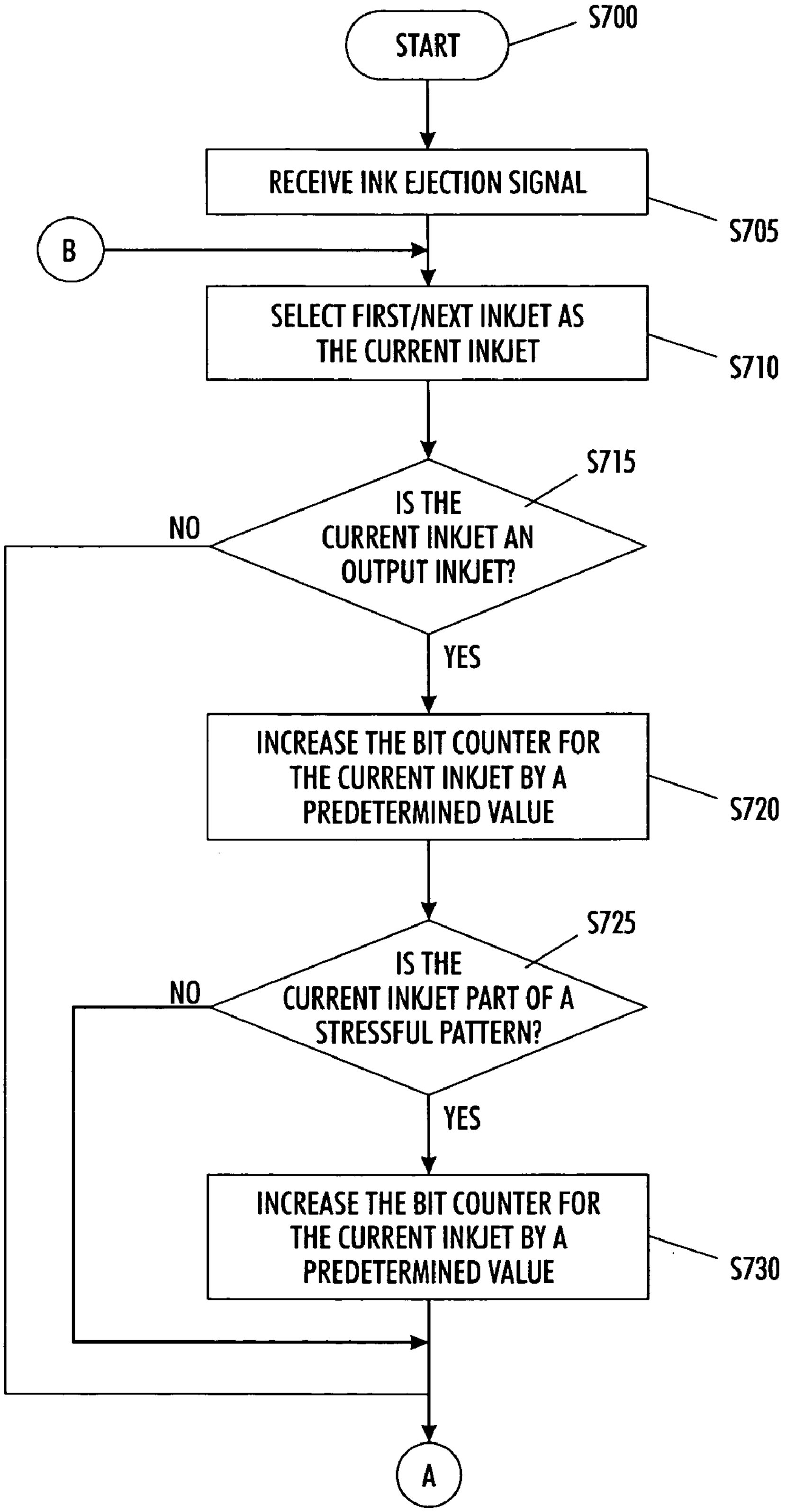
FIGS. 7 and 8 show an exemplary method of tracking that activity of inkjets that is related to becoming defective.
Figure 8:
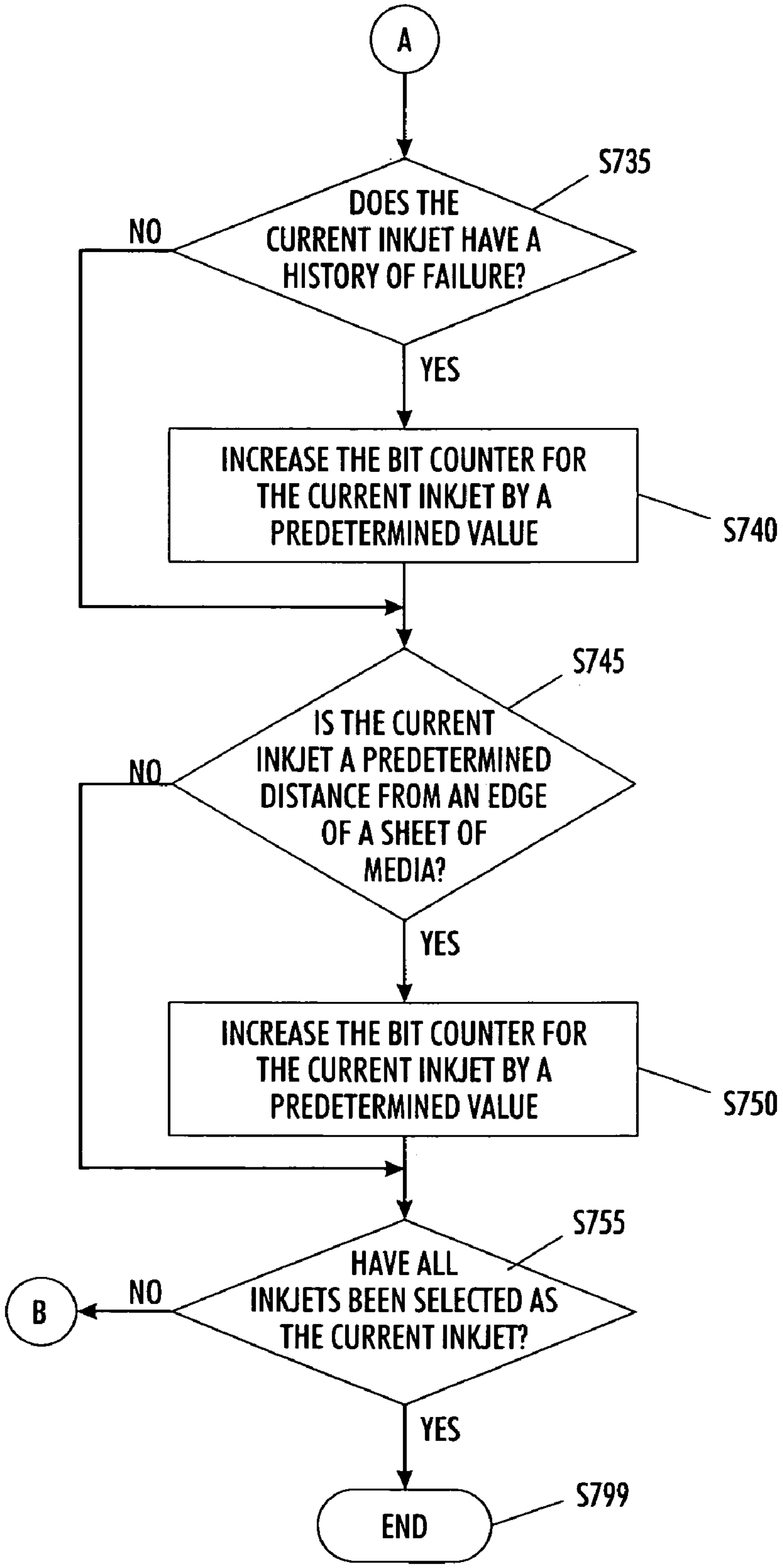

FIGS. 7 and 8 show an exemplary method for monitoring an inkjet's 120 properties using a bit counter. The exemplary method shown in FIGS. 7 and 8 is independent of the exemplary methods shown in FIGS. 4-6, 9, and 10, and provides one example of how individual inkjets 120 can be monitored during normal printing. By continually monitoring the properties of the inkjets 120 during normal printing it is possible to predict which group of inkjets 120 in a print head 110 are more likely to fail compared to the remaining inkjets 120. Thus, for each inkjet 120, certain activities which are more likely to cause an inkjet 120 to fail may be recorded, for example by a bit counter corresponding to that inkjet 120. Then, when it is time to perform an inkjet test (for example, as determined in step S4120), only those inkjets whose history indicates that they are likely to have failed will be tested. For the purpose of this disclosure, a "bit counter" may be any memory or portion of a memory (e.g., memory 199), that is capable of recording the activities of an individual inkjet 120 by, for example assigning numerical values to certain activities and maintaining a record, by addition of numerical values or otherwise, of those activities.

According to this exemplary embodiment, a bit counter corresponding to each inkjet 120 in the inkjet device 100 may be stored in the memory 199. As shown in FIGS. 7 and 8, operation of the method begins in step S700. Next, operation continues to step S705 where an ink ejection signal is received for a group of substantially simultaneous ink ejections. Each ink ejection signal causes one or more inkjets to substantially simultaneously eject ink to form a small portion of the image that is being printed. When all of the small image portions are taken together, they form a complete image. Thus, for each small image portion, the controller 195 will send an ink ejection signal to the various inkjets 120 that will eject ink to form that portion of the image.

After the ink ejection signal is received, operation continues to step S710. In step S710, the first/next inkjet 120 is selected as the current inkjet. Then, in step S715 it is determined whether the current inkjet is an output inkjet, i.e., whether the current inkjet will be ejecting ink to form the image portion corresponding to the received ink ejection signal. If the current inkjet is not an output inkjet, operation jumps to step S735. If the current inkjet is an output inkjet, operation continues to step S720. In step S720, the bit counter for the current inkjet is increased by a predetermined value. Thus, for example, every time an inkjet 120 is utilized as an output inkjet, its likelihood of becoming clogged increases. This relative increased likelihood of being clogged is reflected in the increase (by adding the predetermined value) in the value of the bit counter corresponding to that inkjet 120. The predetermined value in step S720 may be determined depending on the likelihood that an inkjet 120 will become clogged based on use and may be set in proportion to the various other factors that may cause clogging discussed herein. Operation continues to step S725.

In step S725, it is determined whether an inkjet 120 is part of a stressful ejection pattern. Certain types of output patterns, can increase an inkjet's 120 chances of becoming clogged, for example, patterns more likely to cause the ingestion of an air bubble, by an inkjet that could lead to a clog. Such stressful patterns could include, for example, simply an alternating one on and then one off repeating pattern of ejection of a given inkjet. If the current inkjet is not part of a stressful pattern, operation jumps to step S735. If the current inkjet is part of a stressful pattern, operation continues to step S730.

In step S730, the bit counter for the current inkjet is increased by a predetermined value. Again, the relative increased likelihood of being clogged is reflected in the increase in the value of the bit counter corresponding to that inkjet 120. The predetermined value in step S730 may be determined depending on the likelihood that an inkjet 120 will become clogged based on a stressful pattern and may be set in proportion to the various other factors that may cause clogging discussed herein. Furthermore, the predetermined value may be set differently for different stressful patterns based on their relative likelihood of contributing to the clogging of the current inkjet (the more stressful the ejection pattern, the higher the predetermined value). Operation continues to step S735.

In step S735, it is determined whether the current inkjet has a history of recoverable failure. This determination may be made based on, for example, the number of times and or frequency that the current inkjet's bit counter has exceeded the predefined limit in step S615, or the number of times the current inkjet has actually become defective based on, for example, stored inkjet defect test results. If the current inkjet does not have a history of recoverable failure, operation jumps to step S745. If the current inkjet has a history of recoverable failure, operation continues to step S740.

In step S740, the bit counter for the current inkjet is increased by a predetermined value. It should be appreciated that the current inkjet's bit counter may be increased in this step even if the current inkjet does not output ink according to the ink ejection signal. The predetermined value may be a general value applied to all inkjets with a history of failure and may be determined based on, for example, how accurately the bit counter in general predicted the failure of certain inkjets in the past. Alternatively, the predetermined value may be a separate value specific to each inkjet 120 with a history of failure that attempts to correct for any inaccuracies in that specific inkjet's 120 bit counter. For example, assume a certain inkjet 120 tends to fail substantially sooner than the corresponding bit counter reaches the predefined limit. The predetermined value in step S740 would then be adjusted, by for example the controller 195, such that the corresponding bit counter would be substantially closer to the predetermined limit the next time the inkjet failed, thus improving the accuracy of that bit counter.

Similarly, if the current inkjet has a history of normal operation without failure, the predetermined value added may be a negative value. For example, assume a certain inkjet 120 tends to fail substantially later than the corresponding bit counter reaches the predefined limit. The predetermined value in step S740 would then be adjusted, by for example the controller 195, such that the corresponding bit counter would be substantially closer to the predetermined limit the next time the inkjet failed, thus improving the accuracy of that bit counter. Operation continues to step S745.

In step S745, it is determined whether the current inkjet is a predetermined distance from an edge of a sheet of media 190. Because different sizes of media are used, the same group of inkjets 120 will not always be the same distance from the edge of a sheet of media 190. When an inkjet 120 is within a predetermined distance of the edge of a sheet of media 190, particulates from the sheet of media 190 tend to be deposited on and around the print head 110 which can clog one or more of the inkjets 120 within the predetermined distance from the edge. If the current inkjet is not within the predetermined distance from the edge of the sheet of media 190, operation jumps to step S755. If the current inkjet is within the predetermined distance from the edge of the sheet of media 190, operation continues to step S750.

In step S750, the bit counter for the current inkjet is increased by a predetermined value. Again, it should be appreciated that the current inkjet's bit counter may be increased in this step even if the current inkjet does not output ink according to the inkjet ejection signal. Furthermore, the predetermined value may be determined based on, for example, the likelihood that an inkjet 120 will become clogged based on its proximity to an edge of a sheet of media 190 and may be set in proportion to the various other factors that may cause clogging discussed herein. The predetermined value may be constant for all inkjets 120 within the predetermined distance or may be skewed depending on the exact distance within the predetermined distance (i.e., the closer to the sheet of media 190, the higher the predetermined value.

Operation Continues to Step S755

In step S755, it is determined whether all of the inkjets 120 have been selected as the current inkjet. If all of the inkjets 120 have not been selected as the current inkjet, operation returns to step S710 where the next inkjet 120 is selected as the current inkjet, and the method repeats. If all of the inkjets 120 have been selected as the current inkjet, operation continues to step S799, where operation of the method ends.

It should be appreciated that, for ease of explanation, the exemplary method shown in FIGS. 7 and 8 has been described for a single ink ejection signal. However, it may be repeated as necessary for each subsequent ink ejection signal. Furthermore, if the inkjet device 100 has a plurality of print heads 110, the method of FIGS. 7 and 8 could be repeated for each print head until all inkjets 120 within all print heads 110 have been selected as the current inkjet. It should also be appreciated that, according to this exemplary embodiment, whenever an inkjet 120 is purged during a maintenance cycle, that portions of an inkjet's bit counter are reset, for example, under control of the controller 195.

In the exemplary method for monitoring an inkjets properties using a bit counter shown in FIGS. 7-8, one or more steps may be added, combined, separated, or omitted depending on, for example, cost and resource considerations or on stored failure data that is accumulated as a result of inkjet defect tests. Furthermore, the various predetermined values in steps S720, S730, S740, and S750 may be adjusted as necessary based on analysis, statistical or otherwise, of stored failure data that is accumulated as a result of inkjet defect tests in order to increase the likelihood that the bit counters will more accurately predict specific inkjet 120 recoverable failures.

Thus, according to the above-described exemplary embodiment, by adjusting the failure detection frequency proportional to the failure probability data rate (step S405 and FIGS. 5, 9, and 10), inkjet defect tests will be performed when more frequent recoverable failures are expected. Conversely, as the failure probability rate begins to decrease, it becomes desirable to decrease the test frequency (i.e., to increase the interval between inkjet defect test cycles), thus saving ink and time. The overall effect is to optimize the detection and recovery from failures, enhancing print head and printer reliability.

Furthermore, according to the above-describe exemplary embodiment, once it is determined that an inkjet defect test should be performed, only those inkjets 102 that are likely to have failed or are close to failure will be tested (step S415, FIGS. 6-8). Therefore, the ink and time that would be required to include the remaining inkjets 120 that are determined unlikely to have failed, will be saved. An overall effect of the above-described exemplary embodiment is that inkjet defect tests will be conducted only when it is likely that a failure has occurred, and only on those inkjets likely to have failed.

It should be appreciated that although the above-described exemplary embodiment was described as using an increasing bit counter to determine whether a particular inkjet 120 was prone to failure, in various other exemplary embodiments, an inkjet's bit counter may be increased and/or decreased depending on the activity of that inkjet. For example, certain activities may be determined to decrease the likelihood that a jet will become defective and those activates may be used to decrease the inkjet's bit counter. Furthermore, other methods or mechanisms may be used that keep track of the activity of individual inkjets 120, such as, for example, multivariable formulas, equations and/or algorithms for predicting probabilities based on various inkjet effecting parameters. The inkjet effecting parameters may include, for example, position of an inkjet on the print head; failure history of an inkjet, drop ejection history of an inkjet including whether such drop ejection was part of stressful patterns; number and length of pages of paper or output medium printed, including the position of the medium and the medium edge relative to the inkjet; number of passes of the imaging surface by the inkjet; the ejection to ejection frequency, ink drop mass (and history thereof), that the inkjet has been fired at, and any other machine configuration or operating parameters that would be relevant to inkjet performance.

It should also be appreciated that the above-described factors for increasing the bit counter (or otherwise adjusting a mechanism for tracing the activity of individual inkjets) are merely exemplary. Any factor that is known or subsequently determined to effect the likelihood that an individual jet will become defective may be used. For example, in various exemplary embodiments, a bit counter or other tracking mechanism may be increased, decreased, or properly adjusted depending on whether a jet is positioned over a sheet of media or outside the sheet of media, i.e., its position relative to the sheet of media.

Finally, it should be appreciated that although the above-described exemplary embodiment was described using an inkjet printer utilizing an intermediate substrate to jet upon and from which subsequently a transfer of the image to the final medium is made, in various other exemplary embodiments, other methods of printing ink onto the final medium my be employed such as, for example, printing and ejecting ink drops directly onto the final medium.

While various features of this invention have been described in conjunction with the exemplary embodiments outlined above, various alternatives, modifications, variations, and/or improvements of those features may be possible. Accordingly, the exemplary embodiments of the invention, as set forth above, are intended to be illustrative. Various changes may be made without departing from the spirit and scope of the invention.

What is claimed is:

1. A method for testing inkjets for defects in an inkjet device, comprising:

determining, based on the likelihood that a given inkjet is defective, whether to perform an inkjet defect test;

identifying which inkjets to test based on (1) the likelihood that a given inkjet is defective and (2) a predicted failure rate for each of the inkjets, the number of identified inkjets being less than the total number of inkjets in the inkjet device;

marking a test image on an intermediate substrate using only the identified inkjets, if it is determined to perform an inkjet defect test;

evaluating the test image for defects by using an image sensor;

tracking characteristics of each inkjet related to failure of that inkjet; and quantifying the tracked characteristics, wherein the step of identifying which inkjets to test based on a predicted failure rate for each of the inkjets in the inkjet device comprises:

comparing the quantified characteristics of each inkjet in the inkjet device with a predefined limit;

identifying an inkjet for defect testing if that inkjet's quantified characteristics is over the predefined limit; and adjusting the quantified characteristics for each inkjet in the inkjet device, if that inkjet has a history of failure, based on a position of that inkjet within a predetermined distance relative to an edge of the sheet media.

2. The method of claim 1, wherein determining whether to perform an inkjet defect test comprises:

adjusting a test interval based on failure probability data; and determining, if a print count is greater than the test interval, that an inkjet defect test should be performed.

3. The method of claim 2, wherein the failure probability data is expressed as a function of print interval between recoverable failures.

4. The method of claim 1, wherein, tracking, for each inkjet in the inkjet device, the quantified characteristics of that inkjet related to failure comprises:

tracking, for each inkjet in the inkjet device, the number of times that that inkjet is utilized as an output inkjet.

5. The method of claim 1, wherein, tracking, for each inkjet in the inkjet device, the quantified characteristics of that inkjet related to failure comprises:

tracking, for each inkjet in the inkjet device, the number of times that that inkjet is part of a stressful output pattern.

6. The method of claim 1, further comprising resetting, for each inkjet in the inkjet device, the quantified characteristics for that inkjet following print head maintenance on a print head including that inkjet.

7. A system for testing inkjets for defects in an inkjet device, comprising:

an image sensor that is configured to detect at least one of the presence, intensity, and location of marking material jetted on an intermediate substrate by the inkjets of the inkjet device; and a controller that:

determines, based on the likelihood that a given inkjet is defective, whether to perform an inkjet defect test, identifies which inkjets to test based on (1) the likelihood that a given inkjet is defective and (2) a predicted failure rate for each of the inkjets in the inkjet device, the number of identified inkjets being less than total number of inkjets in the inkjet device;

marks a test image on an intermediate substrate using only the identified inkjets, if it is determined to perform an inkjet defect test; and evaluates the test image for defects by using the image sensor;

tracks characteristics of each inkjet related to failure of that inkjet;

quantifies the tracked characteristics, wherein the step of identifying which inkjets to test based on a predicted failure rate for each of the inkjets in the inkjet device comprises:

comparing the quantified characteristics of each inkjet in the inkjet device with a predefined limit;

identifying an inkjet for defect testing if that inkjet's quantified characteristics is over the predefined limit; and adjusting the quantified characteristics for each inkjet in the inkjet device, if that inkjet has a history of failure, based on a position of that inkjet within a predetermined distance relative to an edge of the sheet media.

8. The system of claim 7, further comprising:

a memory that stores failure probability data;

wherein the controller:

adjusts a test interval based on failure probability data; and determines, if a print count is greater than the test interval, that an inkjet defect test should be performed.

9. An inkjet device including the system of claim 7.

10. The method of claim 1, wherein the method is performed automatically by the inkjet device.

* * * * *